United States Patent
Poth

[19]

[11] Patent Number: 6,129,554
[45] Date of Patent: Oct. 10, 2000

[54] DEVICE FOR ELECTRICAL CONNECTIONS BETWEEN SWITCH ROOMS

[75] Inventor: Rainer Poth, Bad Vilbel, Germany

[73] Assignee: Siemens Aktiengesellschaft, Munich, Germany

[21] Appl. No.: 09/331,033

[22] PCT Filed: Dec. 12, 1997

[86] PCT No.: PCT/DE97/02937

§ 371 Date: Aug. 27, 1999

§ 102(e) Date: Aug. 27, 1999

[87] PCT Pub. No.: WO98/27618

PCT Pub. Date: Jun. 25, 1998

[30] Foreign Application Priority Data

Dec. 16, 1996 [DE] Germany .................... 196 53 676

[51] Int. Cl.⁷ .................................................. H01R 39/00
[52] U.S. Cl. ............................................. 439/8; 439/246
[58] Field of Search .................................. 439/8, 6, 251, 439/246, 247, 248, 95, 108

[56] References Cited

U.S. PATENT DOCUMENTS 3,842,187 10/1974 Barkan ........................................ 439/8
5,980,290 11/1999 Meynier et al. .......................... 439/8

FOREIGN PATENT DOCUMENTS

| 0 199 249 | 10/1986 | European Pat. Off. . |
| 0 199 891 | 11/1986 | European Pat. Off. . |
| 0 520 933 | 12/1992 | European Pat. Off. . |
| 85 12 168 | 9/1985 | Germany . |

Primary Examiner—Paula Bradley
Assistant Examiner—Tho D. Ta
Attorney, Agent, or Firm—Kenyon & Kenyon

[57] ABSTRACT

An electrical coupling device for connecting separable connecting leads between at least two switchrooms is in particular for medium voltage switchgears, the connecting leads being passed through container walls and surrounded, in each case, by a rotationally symmetrical insulating body, the insulating bodies being surrounded by an insulating collar that is common to both, the connecting leads being connected by a contact device in an electrically conductive manner. Lead-in pins are provided on front-form sides with a multi-contact which acts as an annular contact body for receiving a contact pin. The contact pin is configured in one piece and is also spherical in the area of the multi-contact. The contact pin is surrounded by a sleeve, which in the longitudinal middle area of the contact pin is configured so as to curve inward and is connected to the sleeve in an electrically conductive manner. The degree of freedom in the angular, lateral, and axial area is compensated for using this electrical coupling device. Electrical coupling devices of this type are employed in medium voltage switchgears.

4 Claims, 1 Drawing Sheet

DEVICE FOR ELECTRICAL CONNECTIONS BETWEEN SWITCH ROOMS

FIELD OF THE INVENTION

The invention relates to an electrical coupling device for connecting separable connecting leads between at least two switchrooms, in particular for medium voltage switchgears, the connecting leads being passed through container walls and surrounded, in each case, by a rotationally symmetrical insulating body, the insulating bodies being surrounded by an insulating collar that is common to both, and the connecting leads being connected by a contact device in an electrically conductive manner.

BACKGROUND INFORMATION

One electrical coupling device is described in European patent 0 199 249. There, two electrical conductors are surrounded, in each case, by rotationally symmetrical insulating bodies, the conductors being located across from each other with clearance, and their insulating bodies having a central recess. The cavity formed by the clearance of the insulating bodies and by their central recess, is formed by a collar which is fitted to the exterior contour of the insulating body, the cavity in its middle area being closed off by a bulge of the collar. In the cavity is located a contact device, which encloses the two conductor ends having a shaft-shaped cross-sectional contour. At each of its ends the contact device is pressed to the conductor ends by an annular spring having a radially-acting force component. As a result of the existing cavity, which is enlarged still more by the circumferential bulge, the contact device is able to compensate for misalignments of the conductor ends within certain limits.

SUMMARY

An object of the present invention is to provide a coupling device between the conductors while maintaining the compensation for the misalignments of the conductor ends, the coupling device capable of being produced using significantly simpler structural means than is the case with the conventional devices, and in which, particularly, misalignment compensation is assured within the widest possible limits, without impairing the contacting and without altering the structural means. In addition, the contacting between the conductors as well as the loads created by the electrical fields within the insulating medium are additionally improved. In accordance with present invention, this is achieved by providing a device in which the free ends of the connecting leads extending out of the switchrooms are realized by a first and by a second lead-in pin, which have annular recesses for receiving a contact pin, the recesses being provided with a multi-contact at the front-form, facing sides. Additionally the contact pin is configured in one piece and is spherical in the area of the multi-contact. Moreover the insulating collar is formed from a sleeve composed of silicon rubber, which in the longitudinal middle area of the contact pin has a curved shape. Futhermore the sleeve is furnished in the curved part with a potential conductive layer extending, in each case, up to the adjacent lead-in pin, and forms with the contact pin an annular potential- contact point. Also, the sleeve is fixed in position in the area of the housing by a pressure sleeve. Finally, the sleeve has a ground potential-conductive layer in the circumferential area facing outward, which conductively connects the container walls.

On the basis of the contact pin, configured as a one-piece compact component provided between the two lead-in pins, the contact pin being configured spherically at the free ends and being supported in the correspondingly annular recesses of the lead-in pins, a coupling device is created which provides optimal conditions for tolerance compensation between the conductors. Thus, for example, both conductors, connected to the respective lead-in pins, are brought together in the permissible area of tolerance at any given angle with respect to each other, without additional adjustments of the electrical coupling devices being foreseen. At the same time, lateral misalignments, i.e., deviations from the ideal middle axis of the respective lead-in pin, are compensated for in a simple manner.

As a result of the relatively large contact surfaces between the end areas of the respective lead-in pins and the contact pins shaped spherically at their ends, longitudinal tolerances between the switchrooms can also being compensated for without difficulty.

In this connection, the present invention also provides that the sleeve includes the potential-conductive layer in the curved area, independent of the predominating misalignments in the angular, lateral, and/or axial direction, always forms an electrically conductive connection to the annular potential-contact point of the contact pin. As a result of this measure, in addition to the contact between the lead-in pins in the area of the multi-contact, there is always a further contact area, which on the whole contributes significantly to increasing the reliability of the contact between the conductors.

In one example embodiment of the present invention, the pressure sleeve is positioned between the container walls in a force-locking manner using a compression spring. On the basis of this measure, a very stable connection between the switchrooms is produced, notwithstanding misalignments due to tolerances.

In accordance with another example embodiment of the present invention, the sleeve is connected, in the area of the free ends of the curved part, to an annular-configured first and second field control electrode-potential.

Additionally, the first and the second field control electrode-potentials are connected in an electrically conductive manner to the potential-conductive layer of the sleeve. Thus the border area between the external periphery of the housing and the sleeve made of silicon rubber having its so-called slide-fit joint is protected in a particular manner against the damaging influences of the electrical fields that are generated.

DETAILED DESCRIPTION

Figure 1:
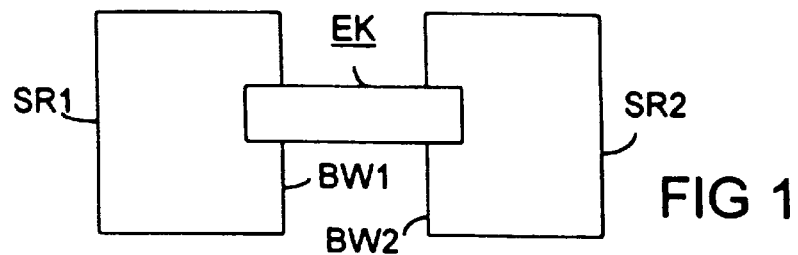
FIG. 1 shows the principal position of the electrical coupling device between the two switchrooms of a medium voltage switchgear

FIG. 1 shows electrical coupling device EK, which electrically connects two switchrooms SR1, SR2 of a medium voltage switchgear. Switchrooms SR1, SR2 of the medium voltage switchgear can be filled with a protective gas so that the electrical coupling devices are passed through the corresponding container walls BW1, BW2 gas-tight.

Figure 2:
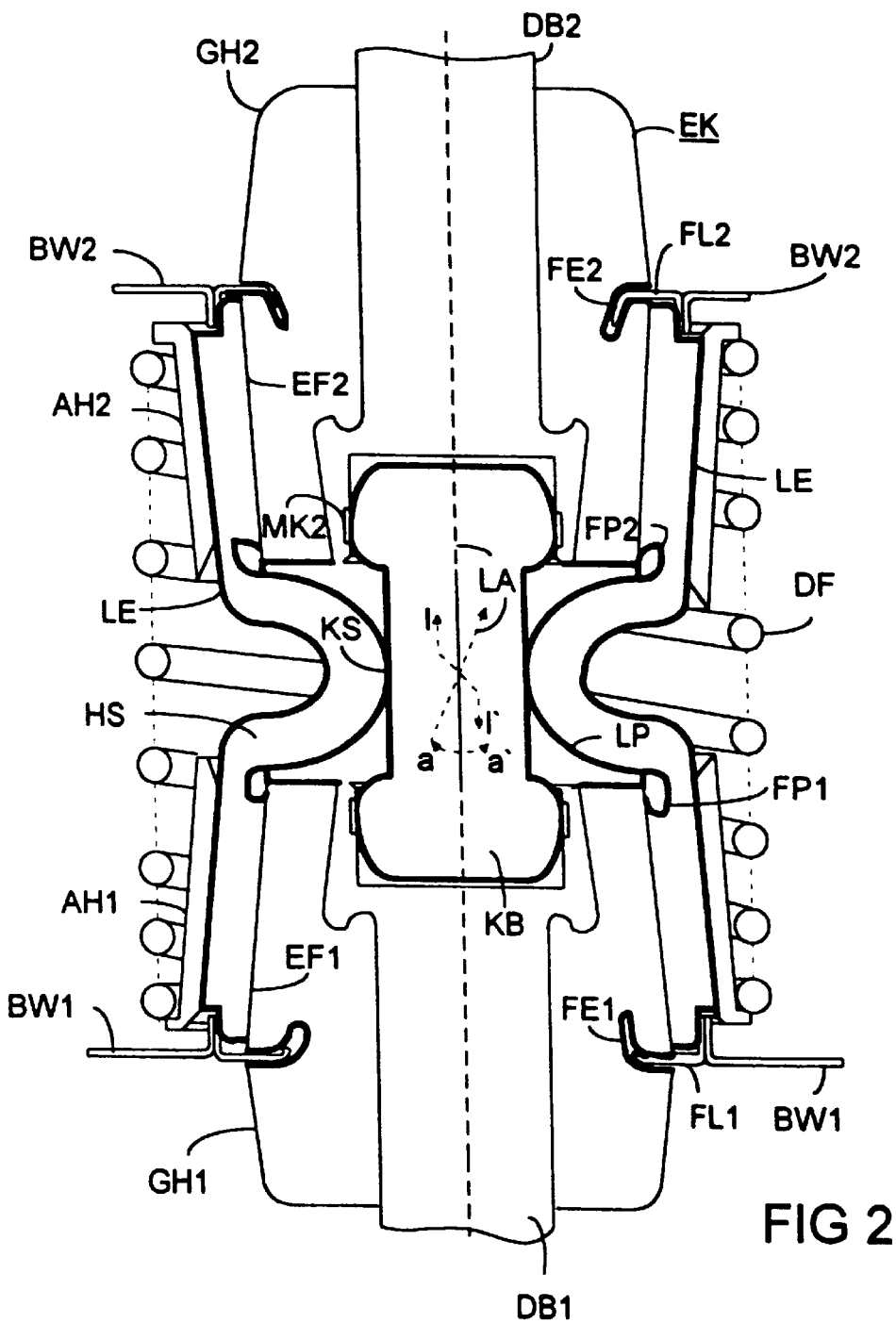
FIG. 2 shows further details of the electrical coupling unit according to an example embodiment of the present invention.

FIG. 2 depicts further details of electrical coupling device EK, in which both lead-in pins DB1, DB2, in connection with contact pin KB, create the electrically conductive connection between lead-in pins DB1, DB2, which are passed through respective container walls BW1, BW2. Furthermore, lead-in pins DB1, DB2, in each case, are surrounded by the respective housing GH1, GH2, it being possible to make the housings GH1, GH2, for example, out of cast resin. Housings GH1, GH2 have an annular circumferential groove, which, as field control electrode-ground potential FE1, FE2, is connected to the ground potential. In field control electrode-ground potential FE1, FE2, flanges FL1, FL2 are welded, which are connected, in a gas-tight manner if appropriate, to respective container wall BW1, BW2 of corresponding switchroom SW1, SW2 (FIG. 1).

Furthermore, it can be seen that contact pin KB, as a one-piece component, has at its ends spherical areas which are supported in the corresponding recesses of lead-in pins DB1, DB2. As a contact junction, within the recesses of lead-in pins DB1, DB2, provision is made for an annular so-called multi-contact MK1, MK2, which guarantees the contact between lead-in pins DB1, DB2 and contact pin KB, even when lead-in pins DBl, DB2 are not in alignment with each other. In addition, it can be seen that housings GH1, GH2 in their inwardly pointing conical area are surrounded by sleeve HS, which in the middle area of contact pin KB has an annular taper. The annular taper, at the same time, forms potential contact point KS, so that the potential is directly transmissible both between the end areas of lead-in pins DB1, DB2 as well as via field control electrode-potential FP1, FP2. As a result of potential contact point KS produced at contact pin KB, two contact areas, independent of the possible tolerance displacements of lead-in pins DB1, DB2 with regard to each other, are formed always independently of each other, which ensure the electrical connection between lead-in pins DB1, DB2.

FIG. 2 also shows that longitudinal middle axis LA, and thus lead-in pins DB1, DB2, can be misaligned with respect to each other in angle area a, a' as well as in longitudinal tolerance area 1, 1', without the contact between lead-in pins DB1, DB2 being impaired. Moreover, it can be seen that longitudinal middle axis LA of lead-in pins DB1, DB2 can also be displaced in the alignment direction parallel with respect to each other. Even in this case, the electrical coupling device adjusts automatically so that the electrical connection between lead-in pins DB1, DB2 is faultlessly maintained.

Between housing GH1, GH2 and sleeve HS, common to the two housings GH1, GH2, so-called slide-fit joint EF1, EF2 is formed, which is protected, in a particular manner, against electrical fields and thus is protected against flashover onto the adjoining areas, for example, container walls BW1, BW2 by field control electrode-potential FP1, FP2 as well as by the inner area of sleeve HS, connected to potential-conductive layer LP.

The external area of sleeve HS is provided with ground potential-conductive layer LE and represents the ground potential connection between container walls BW1, BW2.

Sleeve HS, common to both housings GH1, GH2, is pressed onto corresponding housing GH1, GH2 using pressure sleeves AH1, AH2 in the area of respective slide-fit joint EF1, EF2. It can further be seen that between the two container walls BW1, BW2 a compression spring DF presses respective pressure sleeves AH1, AH2 against container walls BW1, BW2, and thus for the contact assures a stabilized support of electrical coupling device EK between container walls BW1, BW2.

What is claimed is:

1. An electrical coupling device for coupling together two switchrooms, comprising:

separable connecting leads;

container walls provided for the switchrooms, the connecting leads being passed through the container walls, free ends of the connecting leads including lead-in pins, each of the lead-in pins having an annular recess and being provided with a multi-contact, a contact pin being formed in one piece and each free end of the contact pin being spherical in an area of the multi-contact, each free end of the contact pin being received in each corresponding recess;

a respective rotationally symmetrical insulating surrounding each of the connecting leads;

an insulating collar common to the insulating bodies and surrounding the insulating bodies, the insulating collar being formed from a sleeve made of silicon rubber and having a curve shaped portion in a longitudinal middle area of the contact pin, the silicon rubber sleeve including, in the curve shaped portion, a potential conductive layer extending to the lead-in pins, and forming, with the contact pin, an annular potential contact point, the silicon rubber sleeve having a ground potential-conductive layer on a circumferential area facing outward which conductively couples the container walls; and pressure sleeves fixing the silicon rubber sleeve in position in an area of the insulating bodies of the connecting leads.

2. The electrical coupling device according to claim 1, wherein the electrical coupling device is for medium voltage switchgear.

3. The electrical coupling device according to claim 1, wherein the pressure sleeves are positioned in a force-locking manner using a compression spring between the container walls.

4. The electrical coupling device according to claim 1, wherein the silicon rubber sleeve is coupled, in an area of free ends of the curve shaped portion, to annular first and second field control electrode-potentials, the first and second field control electrode-potentials being coupled in an electrically conductive manner to the potential-conductive layer of the silicon rubber sleeve.

* * * * *